(12) United States Patent
Abe et al.

(10) Patent No.: US 10,598,911 B2
(45) Date of Patent: Mar. 24, 2020

(54) OBJECTIVE

(71) Applicant: OLYMPUS CORPORATION, Hachioji-shi, Tokyo (JP)

(72) Inventors: Kenichiro Abe, Tokyo (JP); Hirokazu Konishi, Tokyo (JP); Masahiro Sakakura, Tokyo (JP); Takashi Kasahara, Tokyo (JP); Yuso Fujita, Tokyo (JP)

(73) Assignee: OLMYPUS CORPORATION, Tokyo (JP)

( * ) Notice: Subject to any disclaimer, the term of this patent is extended or adjusted under 35 U.S.C. 154(b) by 47 days.

(21) Appl. No.: 15/784,725

(22) Filed: Oct. 16, 2017

(65) Prior Publication Data
US 2018/0113293 A1    Apr. 26, 2018

(30) Foreign Application Priority Data
Oct. 20, 2016   (JP) .................................. 2016-206387

(51) Int. Cl.
*G02B 21/02*    (2006.01)
*G02B 9/18*     (2006.01)

(52) U.S. Cl.
CPC ............ *G02B 21/025* (2013.01); *G02B 9/18* (2013.01); *G02B 21/02* (2013.01)

(58) Field of Classification Search
None
See application file for complete search history.

(56) References Cited

U.S. PATENT DOCUMENTS

2002/0089760 A1    7/2002   Yamaguchi
2002/0154414 A1   10/2002   Matthae et al.
(Continued)

FOREIGN PATENT DOCUMENTS

DE    102005027423 A1   12/2006
DE    102010014502 A1   10/2011
(Continued)

OTHER PUBLICATIONS

Extended European Search Report (EESR) dated Mar. 6, 2018 issued in counterpart European Application No. 17196544.5.
(Continued)

*Primary Examiner* — William R Alexander
*Assistant Examiner* — Gary W O'Neill
(74) *Attorney, Agent, or Firm* — Holtz, Holtz & Volek PC

(57) ABSTRACT

An objective includes a first lens group that has a positive refractive power and a second lens group that has a negative refractive power. The objective includes a first negative lens and satisfies $$0.005 \leq d_{o1}/h_{o1} \leq 0.1 \tag{1}$$

$$0.005 \leq h_{min}/h_l \leq 0.72 \tag{2}$$

$$10 \text{ mm} \leq L \leq 100 \text{ mm} \tag{3}$$

$$0.1 \leq L/f \leq 31 \tag{4}$$

when $d_{o1}$ is a thickness of the first negative lens, $h_{o1}$ is an axial marginal ray height on a lens surface on the object side of the first negative lens, $h_{min}$ is a minimum value of an axial marginal ray height in the second lens group, $h_l$ is a height of an axial marginal ray on a lens surface of the objective that is situated closest to the image side, L is a length of the objective, and f is a focal length of the objective.

20 Claims, 9 Drawing Sheets

(56) References Cited

U.S. PATENT DOCUMENTS

| | | |
|---|---|---|
| 2003/0043473 A1 | 3/2003 | Okuyama |
| 2006/0082896 A1 | 4/2006 | Mandai et al. |
| 2006/0203354 A1 | 9/2006 | Fujimoto et al. |
| 2006/0279847 A1 | 12/2006 | Matthae et al. |
| 2008/0149867 A1 | 6/2008 | Konishi et al. |
| 2009/0032732 A1 | 2/2009 | Konishi et al. |
| 2010/0202062 A1 | 8/2010 | Yoshida |
| 2011/0043906 A1 | 2/2011 | Saito et al. |
| 2013/0003187 A1 | 1/2013 | Wartmann |
| 2013/0271829 A1* | 10/2013 | Kasahara ............ G02B 21/02 359/385 |
| 2013/0271847 A1 | 10/2013 | Hoyer et al. |
| 2016/0116724 A1 | 4/2016 | Abe |

FOREIGN PATENT DOCUMENTS

| | | | |
|---|---|---|---|
| JP | 2000035541 A | 2/2000 | |
| JP | 2002341249 A | 11/2002 | |
| JP | 2003015047 A | 1/2003 | |
| JP | 2006113486 A | 4/2006 | |
| JP | 2007121338 A | 5/2007 | |
| JP | 2013033274 A | 2/2013 | |
| JP | 2014048342 A | 3/2014 | |
| JP | 2016085335 A | 5/2016 | |

OTHER PUBLICATIONS

Related U.S. Appl. No. 15/782,104, filed Oct. 12, 2017, First Named Inventor: Hirokazu Konishi, Title: Immersion Objective.

Notice of Allowance dated Feb. 6, 2019 issued in related U.S. Appl. No. 15/782,104.

Extended European Search Report (EESR) dated Mar. 6, 2018 issued in a related European Application No. 17196544.5.

* cited by examiner

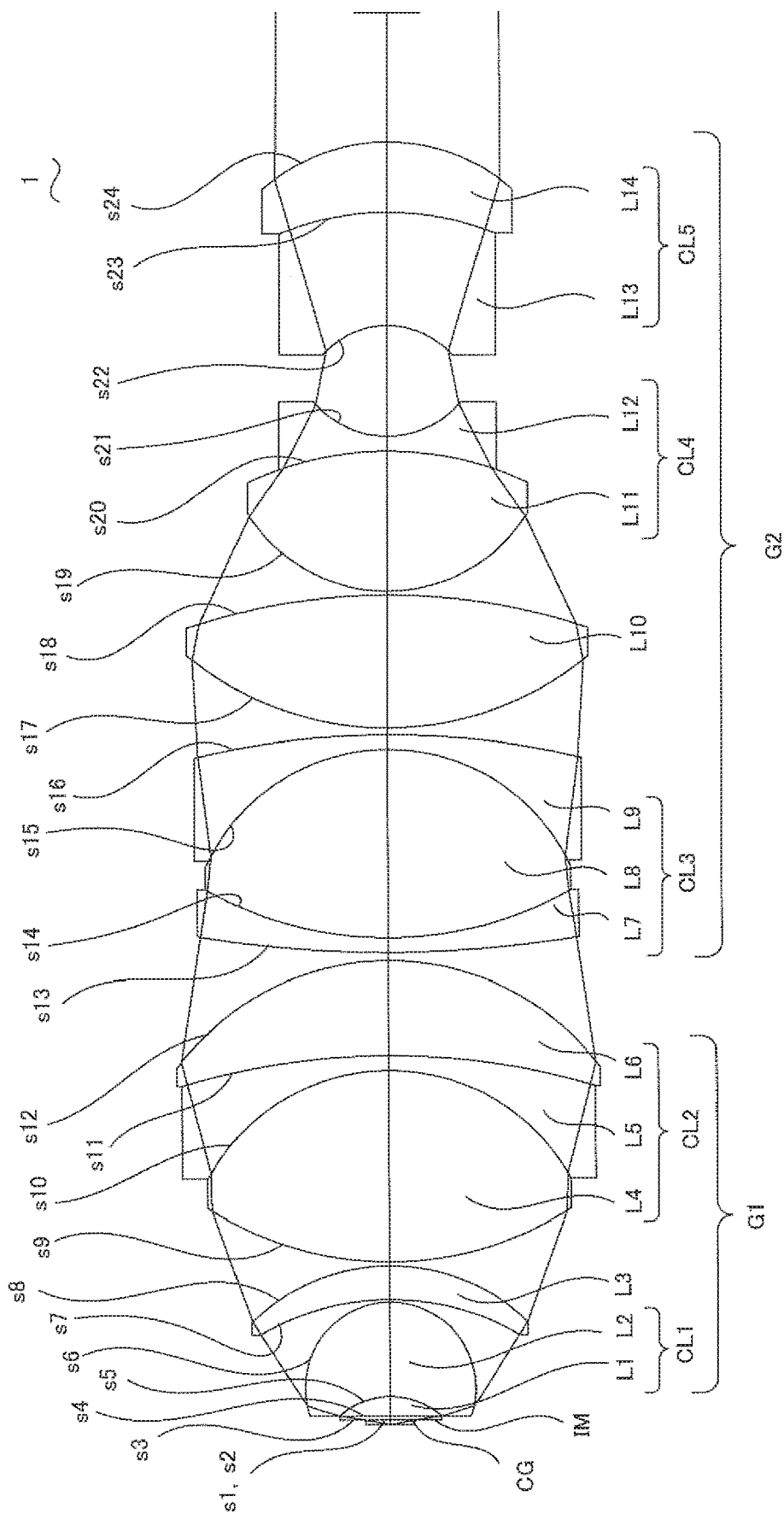
F I G. 1

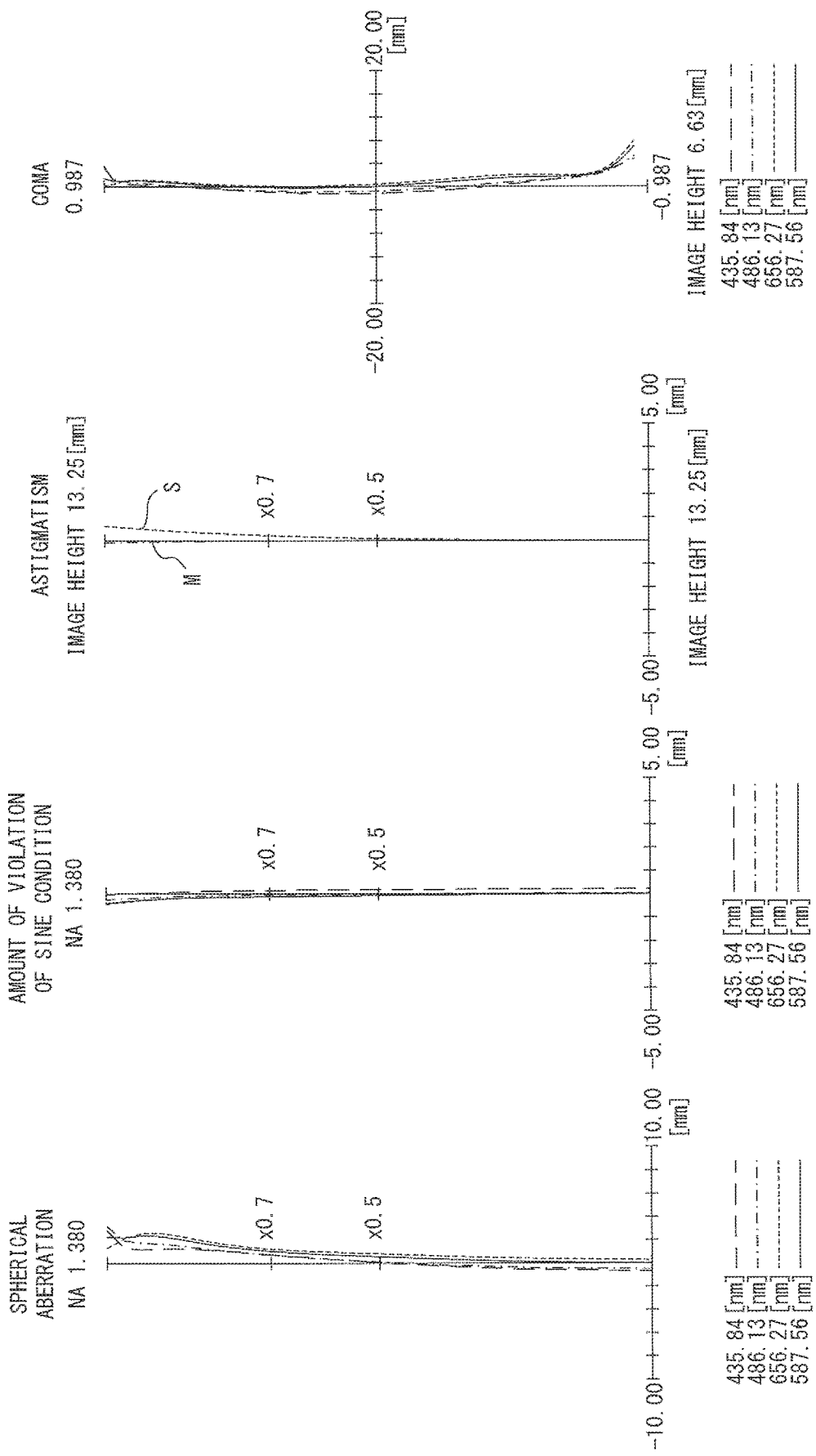

OBJECTIVE

CROSS REFERENCE TO RELATED APPLICATIONS

This application is based upon and claims the benefit of priority from prior Japanese Patent Application No. 2016-206387, filed Oct. 20, 2016, the entire contents of which are incorporated herein by this reference.

BACKGROUND OF THE INVENTION

Field of the Invention

The present invention relates to an objective.

Description of the Related Art

In recent years, an imaging element has been developed that offers a significantly high pixel count, and also in the field of microscopy, there has been an increase in expectations for a microscope apparatus that can perform an observation and capture an image while ensuring a wide field and a high resolution at the same time. In order to realize such a microscope apparatus, there has been a need for a wide-field objective with a high numerical aperture (hereinafter referred to as an NA) whose magnification is included between a medium magnification and a low magnification.

Conventional objectives with a high NA whose magnification is included between a medium magnification and a low magnification are disclosed in, for example, German Patent Application Publication No. 102005027423 and Japanese Laid-open Patent Publication No. 2006-113486.

SUMMARY OF THE INVENTION

An objective according to an aspect of the present invention includes a first lens group that has a positive refractive power and converts a divergent pencil of light from an object point into a convergent pencil of light; and a second lens group that has a negative refractive power and is arranged closer to an image side than the first lens group, wherein the objective includes a first negative lens. When $d_{o1}$ is a thickness of the first negative lens on an optical axis, $h_{o1}$ is a height of an axial marginal ray on a lens surface on the object side of the first negative lens, $h_{min}$ is a minimum value of a height of an axial marginal ray in the second lens group, $h_I$ is a height of an axial marginal ray on a lens surface of the objective that is situated closest to the image side, L is a length of the objective, and f is a focal length of the objective, the objective satisfies conditional expressions below $$0.005 \leq d_{o1}/h_{o1} \leq 0.1 \tag{1}$$

$$0.005 \leq h_{min}/h_I \leq 0.72 \tag{2}$$

$$10 \text{ mm} \leq L \leq 100 \text{ mm} \tag{3}$$

$$0.1 \leq L/f \leq 31 \tag{4}.$$

BRIEF DESCRIPTION OF THE DRAWINGS

The present invention will be more apparent from the following detailed description when the accompanying drawings are referenced.

FIG. 1 is a cross-sectional view of an objective 1 according to a first example;

FIGS. 9A to 9D are diagrams of an aberration in an optical system that includes the objective 4 and the tube lens 10.

DESCRIPTION OF THE EMBODIMENTS

Figure 2:
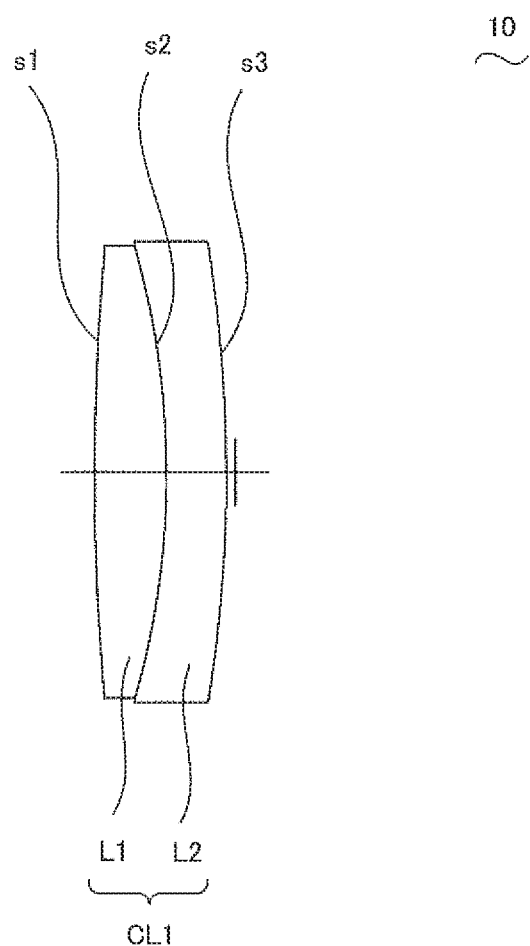
FIG. 2 is a cross-sectional view of a tube lens 10.

A chromatic aberration and a field curvature are not corrected sufficiently in the objectives disclosed in German Patent Application Publication No. 102005027423 and Japanese Laid-open Patent Publication No. 2006-113486 described above.

In view of the above circumstances, an embodiment of the present invention will be described below.

An objective according to an embodiment of the present invention is described. The objective according to the present embodiment (hereinafter simply referred to as an objective) is an infinity-corrected microscope objective used in combination with a tube lens. The objective may be a dry objective or an immersion objective. When the objective is an immersion objective, an immersion liquid to be used is a medium that has a refractive index close to the refractive index inside a sample, and is, for example, water or oil.

The objective includes a first lens group that has a positive refractive power and converts a divergent pencil of light from an object point into a convergent pencil of light, and a second lens group that has a negative refractive power and is arranged closer to the image side than the first lens group. A lens component of the first lens group that is situated closest to the image side is a lens component situated closest to the object side that converts a divergent pencil of light from an object point into a convergent pencil of light and that works so as to emit the convergent pencil of light. In other words, when the objective has a plurality of lens surfaces that emit a convergent pencil of light, a lens surface situated closest to the object side among the plurality of lens surfaces is a lens surface of the first lens group that is situated closest to the image side. A boundary between the first lens group and the second lens group can be identified according to the characteristics described above.

As used herein, the pencil of light is a bundle of light rays emitted from a point on an object (an object point). Further, the lens component is a lens block in which only two surfaces, a surface at the object side and a surface at the image side, from among lens surfaces through which a light ray from an object point passes, have contact with air (or an immersion liquid), regardless of whether it is a single lens or a cemented lens.

The first lens group converts a divergent pencil of light from an object point into a convergent pencil of light and causes the convergent pencil of light to enter the second lens group. The second lens group converts the convergent pencil of light from the first lens group into a collimated pencil of light. It is possible to make the height of a marginal ray in the second lens group smaller than the height of a marginal ray in the first lens group by the first lens group converting a divergent pencil of light from an object point into a convergent pencil of light and causing the pencil of light to enter the second lens group. This makes it possible to effectively correct the Petzval sum in the second lens group having a negative refractive power, which results in being able to favorably correct a field curvature in a wide field.

The objective includes a negative lens (hereinafter referred to as a first negative lens) and is configured to satisfy Conditional Expression (1) below.

$$0.005 \leq d_{o1}/h_{o1} \leq 0.1 \tag{1}$$

Here, $d_{o1}$ is a thickness of the first negative lens on an optical axis. $h_{o1}$ is the height of an axial marginal ray on a lens surface on the object side of the first negative lens. The axial marginal ray is a light ray that is included in a divergent pencil of light from an object point on the optical axis and that passes through a position farthest away from the optical axis in (that is, an outermost position of) an exit pupil of the objective.

It is possible to correct an axial chromatic aberration by the objective including the first negative lens. In order to correct an axial chromatic aberration more effectively, it is preferable that the first negative lens be arranged in a region in which the height of a marginal ray is great.

Conditional Expression (1) is a conditional expression that is primarily used to favorably correct an axial chromatic aberration and a lateral chromatic aberration. It is possible to prevent the first negative lens from becoming too thick by preventing $d_{o1}/h_I$ from exceeding the upper limit. It is also possible to make the height of a marginal ray that enters the first negative lens sufficiently large. Thus, it is possible to favorably correct an axial chromatic aberration and a lateral chromatic aberration while having a configuration in which the objective is not larger than a predetermined size. Further, it is possible to prevent the first negative lens from becoming too thin by preventing $d_{o1}/h_1$ from falling below the lower limit. Thus, it is possible to prevent the occurrence of an aberration due to a stress being applied to a lens when the lens is attached to a lens frame or when the lens is assembled.

The objective is further configured to satisfy Conditional Expression (2) below.

$$0.005 \leq h_{min}/h_I \leq 0.72 \tag{2}$$

Here, $h_{min}$ is a minimum value of the height of the axial marginal ray in the second lens group. $h_I$ is an axial marginal ray on a lens surface of the objective that is situated closest to the image side.

Conditional Expression (2) is a conditional expression that is primarily used to favorably correct a field curvature and a coma. It is possible to make the height of the marginal ray in the second lens group sufficiently smaller than the exit pupil diameter by preventing $h_{min}/h_I$ from exceeding the upper limit. This makes it possible to correct the Petzval sum in the second lens group effectively, which results in being able to favorably correct a field curvature in a wide field. It is possible to prevent the height of the marginal ray in the second lens group from becoming too small by preventing $h_{min}/h_I$ from falling below the lower limit. This results in preventing the second lens group from becoming too large and in adequately suppressing the divergence of a pencil of light near an edge of the objective, so there is no need for a very strong positive refractive power when the pencil of light is converted into a collimated beam at the edge of the objective. Thus, it is possible to reduce a coma that occurs when a pencil of light is converted into a collimated beam.

In the objective, it is possible to favorably correct an off-axis aberration by satisfying both Conditional Expression (1) and Conditional Expression (2). This results in being able to perform a high-definition observation in a wide field.

The objective is further configured to satisfy Conditional Expression (3) and Conditional Expression (4) below.

$$10 \text{ mm} \leq L \leq 100 \text{ mm} \tag{3}$$

$$0.1 \leq L/f \leq 31 \tag{4}$$

Here, L is a length of the objective. f is a focal length of the objective. The length of the objective is a length on the optical axis from a lens surface of the objective that is situated closest to the object side to a lens surface of the objective that is situated closest to the image side.

Conditional Expression (3) is a conditional expression related to the length of the objective. It is possible to have the objective exhibit a predetermined parfocal length by designing the objective to satisfy Conditional Expression (3). Further, it is possible to have an optical system of the objective exhibit a sufficient space to correct an aberration by preventing L from falling below the lower limit. It is possible to favorably correct aberrations such as a chromatic aberration and a field curvature.

Conditional Expression (4) is a conditional expression that ensures a wide field while maintaining the predetermined parfocal length. It is possible to prevent a parfocal length of the objective from being greater than a predetermined length and to perform an observation in a wide field by designing the objective to satisfy Conditional Expression (4). It is possible to prevent a focal length of the objective from becoming too short while ensuring that the parfocal length of the objective does not exceed a predetermined length, by preventing L/f from exceeding the upper limit. This results in being able to prevent the magnification of a microscope optical system from becoming too high, the microscope optical system being a combination of the objective and a tube lens that has a predetermined focal length. Thus, it is possible to perform an observation in a wide field. It is possible to prevent the magnification of the microscope optical system from becoming too low by preventing L/f from falling below the lower limit. This results in being able to perform a high-definition observation.

According to the objective having the configuration described above, it is possible to ensure a high NA and a wide field while favorably correcting a chromatic aberration and a field curvature.

The objective may be configured to satisfy one of Conditional Expression (1-1) to Conditional Expression (1-3) below instead of Conditional Expression (1). Further, the objective may be configured to satisfy one of Conditional Expression (2-1) to Conditional Expression (2-3) below instead of Conditional Expression (2). Furthermore, the objective may be configured to satisfy one of Conditional Expression (3-1) to Conditional Expression (3-3) below instead of Conditional Expression (3). Moreover, the objective may be configured to satisfy one of Conditional Expression (4-1) to Conditional Expression (4-3) below instead of Conditional Expression (4).

$$0.01 \leq d_{o1}/h_{o1} \leq 0.095 \tag{1-1}$$

$$0.02 \leq d_{o1}/h_{o1} \leq 0.087 \tag{1-2}$$

$$0.03 \leq d_{o1}/h_{o1} \leq 0.08 \tag{1-3}$$

$$0.01 \leq h_{min}/h_I \leq 0.7 \tag{2-1}$$

$$0.02 \leq h_{min}/h_f \leq 0.67 \quad (2\text{-}2)$$

$$0.03 \leq h_{min}/h_f \leq 0.63 \quad (2\text{-}3)$$

$$20\text{ mm} \leq L \leq 85\text{ mm} \quad (3\text{-}1)$$

$$30\text{ mm} \leq L \leq 65\text{ mm} \quad (3\text{-}2)$$

$$40\text{ mm} \leq L \leq 50\text{ mm} \quad (3\text{-}3)$$

$$0.27 \leq L/f \leq 31 \quad (4\text{-}1)$$

$$1 \leq L/f \leq 25 \quad (4\text{-}2)$$

$$2.5 \leq L/f \leq 20 \quad (4\text{-}3)$$

A more preferable configuration of the objective is described below.

It is preferable that the first lens group include a first lens component arranged closest to the object side and a second lens component arranged adjacent to the first lens component at the image side of the first lens component. The first lens component includes a first meniscus lens that has a concave surface facing the object side. The second lens component includes a second meniscus lens that has a positive refractive power and has a concave surface facing the object side.

It is possible to correct the Petzval sum effectively by arranging the first lens component including the first meniscus lens in a region around the object side in which the height of a marginal ray is small. Further, it is possible to reduce the divergence of a pencil of light while suppressing the occurrence of a spherical aberration and a coma in the second lens component, by arranging the second lens component including the second meniscus lens that has a positive refractive power and has a concave surface facing the object side such that the second lens component is adjacent to the first lens component.

When the objective is an immersion objective, the first lens component may have a plano-convex lens that has a flat or generally flat surface facing the object side. When a lens surface of the objective that is situated closest to the object side is a flat or generally flat surface, this permits an air bubble to be less likely to be collected between an immersion liquid and the objective.

It is preferable that the first lens group include an achromatic lens component (hereinafter referred to as a first achromatic lens component) that includes three-piece cemented lens. The achromatic lens component is a lens component in which a negative lens that configures the achromatic lens component has an Abbe number that is smaller than the Abbe number of a positive lens that configures the achromatic lens component. In other words, the achromatic lens component refers to a lens component in which the negative lens is made of a glass material having an Abbe number that is smaller than the Abbe number of a glass material of the positive lens. Further, when a plurality of positive lenses and a plurality of negative lenses are included, the achromatic lens component refers to a lens component in which the minimum value of the Abbe number of the plurality of positive lenses that configure the lens component is greater than the maximum value of the Abbe number of the plurality of negative lenses that configure the lens component.

It is possible to correct a chromatic aberration effectively while using a space efficiently, by the first lens group including the first achromatic lens component. Particularly, it is possible to correct a chromatic aberration more effectively by the first achromatic lens component being included in the first lens group in which the height of a marginal ray is great. Further, the lens component is configured to include three-piece cemented lens in a region that naturally has a large effective diameter due to a greater height of a marginal ray, which results in being able to maintain the stiffness of the lens component.

It is preferable that the first achromatic lens component be arranged closest to the image side in the first lens group. The reason is that the height of a marginal ray in the first achromatic lens component becomes greater, which results in being able to further increase the effectiveness of a chromatic aberration correction.

It is preferable that the first achromatic lens component have a configuration in which positive lenses are arranged on either sides of a negative lens, that is, that the first achromatic lens component be three-piece cemented lens that are arranged in order of positive lens, negative lens, and positive lens. The reason is that an effect of a chromatic aberration correction is provided on both lens surfaces of the negative lens, which results in being able to correct a chromatic aberration more efficiently.

It is preferable that the first achromatic lens component include the first negative lens that satisfies Conditional Expression (1). The reason is that when the first negative lens is included in the first achromatic lens component arranged in a region in which the height of a marginal ray is great, this permits the first negative lens to correct an axial chromatic aberration more effectively.

It is preferable that the second lens group include an achromatic lens component (hereinafter referred to as a second achromatic lens component) that includes three-piece cemented lens and is arranged in a region near the first lens group. Specifically, the region near the first lens group is a region that satisfies a condition in which the distance on the optical axis between a lens surface of the first lens group that is situated closest to the image side and a lens surface of the second achromatic lens component that is closest to the object side is less than a thickness of the second achromatic lens component on the optical axis.

When the second lens group includes the second achromatic lens component that is arranged in a region near the first lens group, the height of a marginal ray becomes great in the second achromatic lens component. Thus, it is possible to provide an effect similar to the effect in the first achromatic lens component.

It is preferable that the second achromatic lens component be arranged closest to the object side in the second lens group. The reason is that the height of a marginal ray becomes greater in the second achromatic lens component, which results in being able to further increase the effectiveness of a chromatic aberration correction.

The second achromatic lens component may have a configuration in which positive lenses are arranged on either sides of a negative lens, that is, the second achromatic lens component may be three-piece cemented lens that are arranged in order of positive lens, negative lens, and positive lens. The reason is that an effect of a chromatic aberration correction is provided on both lens surfaces of the negative lens, which results in being able to correct a chromatic aberration more efficiently. Further, the second achromatic lens component may have a configuration in which negative lenses are arranged on either sides of a positive lens, that is, the second achromatic lens component may be three-piece cemented lens that are arranged in order of negative lens, positive lens, and negative lens, and specifically, such a configuration is suitable for correcting a spherical aberration and a coma over a wide band of wavelengths in an objective with a high NA. The reason is that it is possible to prevent a spherical aberration and a coma in a narrow band of wavelengths from being overcorrected by a negative lens having a high dispersivity, which results in being able to adequately correct a spherical aberration in a wide band of wavelengths.

It is preferable that the second achromatic lens component include a second negative lens described later. The reason is that when the second negative lens is included in the second achromatic lens component arranged in a region in which the height of a marginal ray is great, this permits the second negative lens to correct an axial chromatic aberration more effectively.

It is preferable that the objective include a negative lens (hereinafter referred to as a second negative lens) that is different from the first negative lens and be configured to satisfy Conditional Expression (5) below.

$$0.005 \le d_{o2}/h_{o2} \le 0.17 \quad (5)$$

Here, $d_{o2}$ is a thickness of the second negative lens on the optical axis. $h_{o2}$ is the height of an axial marginal ray on a lens surface on the object side of the second negative lens.

It is possible to better correct an axial chromatic aberration by the objective including the second negative lens. In order to correct an axial chromatic aberration more effectively, it is preferable that, like the first negative lens, the second negative lens be arranged in a region in which the height of a marginal ray is great. Conditional Expression (5) is similar to Conditional Expression (1) except that it is for the second negative lens, not for the first negative lens, so the description of Conditional Expression (5) is omitted.

The objective may be configured to satisfy one of Conditional Expression (5-1) to Conditional Expression (5-3) below instead of Conditional Expression (5).

$$0.01 \le d_{o2}/h_{o2} \le 0.15 \quad (5\text{-}1)$$

$$0.02 \le d_{o2}/h_{o2} \le 0.12 \quad (5\text{-}2)$$

$$0.03 \le d_{o2}/h_{o2} \le 0.1 \quad (5\text{-}3)$$

It is preferable that the objective include a meniscus lens (hereinafter referred to as a third meniscus lens) which has a positive refractive power and be configured to satisfy Conditional Expression (6) below.

$$0.02 \le d_{m1}/h_{m1} \le 0.45 \quad (6)$$

Here, $d_{m1}$ is a thickness of the meniscus lens on the optical axis which has a positive refractive power. $h_{m1}$ is the height of an axial marginal ray on a lens surface on the object side of the meniscus lens which has a positive refractive power.

It is possible to gradually suppress the divergence of a pencil of light by the objective including a meniscus lens that has a positive refractive power and that is arranged such that its concave surface faces a side that the divergent pencil of light enters, which results in being able to convert the divergent pencil of light into a collimated beam or a convergent beam while suppressing the occurrence of a spherical aberration and a coma.

Conditional Expression (6) is a conditional expression that is primarily used to favorably correct a spherical aberration and a coma. It is possible to arrange the meniscus lens in a narrow space by preventing $d_{m1}/h_{m1}$ from exceeding the upper limit. This makes it possible to favorably correct a spherical aberration and a coma while configuring the objective so as to not become larger than a predetermined size. Further, it is possible to prevent the meniscus lens from becoming too thin by preventing $d_{m1}/h_{m1}$ from falling below the lower limit. Thus, it is possible to prevent the occurrence of an aberration due to a stress being applied to a lens when the lens is attached to a lens frame or when the lens is assembled.

The meniscus lens that satisfies Conditional Expression (6) may be arranged in the first lens group or in the second lens group. In order to better correct a spherical aberration, it is preferable that the meniscus lens be arranged closer to the object side than the first negative lens in the first lens group. The reason is that the effect described above to suppress the occurrence of a spherical aberration can be produced more significantly by arranging the meniscus lens in a region closer to the object side than the first negative lens from which a pencil of light from a sample is diverged. In order to better correct a coma and a field curvature, it is preferable that the meniscus lens be arranged in a region near the image side in the second lens group. It is possible to correct a field curvature more effectively when the height of the marginal ray in the second lens group is made smaller, but a coma is likely to be larger because the divergence of a pencil of light is increased when the pencil of light enters subsequent portions in the optical system. Regarding this point, it is possible to gradually convert a pencil of light into a collimated beam while suppressing the occurrence of a coma, by arranging the meniscus lens in the region near the image side in the second lens group, which results in better correction to both a coma and a field curvature. Here, the region near the image side in the second lens group refers to a region closer to the image side than a position in which the height of a marginal ray is smallest in the second lens group.

The objective may be configured to satisfy one of Conditional Expression (6-1) to Conditional Expression (6-3) below instead of Conditional Expression (6).

$$0.05 \le d_{m1}/h_{m1} \le 0.41 \quad (6\text{-}1)$$

$$0.07 \le d_{m1}/h_{m1} \le 0.35 \quad (6\text{-}2)$$

$$0.1 \le d_{m1}/h_{m1} \le 0.28 \quad (6\text{-}3)$$

It is preferable that the objective be configured to satisfy Conditional Expression (7) to Conditional Expression (13) below.

$$2.3 \le (h_{max}/f) \times NA_{ob} \le 6.5 \quad (7)$$

$$0.7 \le ((h_{max}-h_{min})/f) \times NA_{ob} \le 3.6 \quad (8)$$

$$-3 \le R_{21}/D_{o21} \le -0.8 \quad (9)$$

$$3.3 \le (R_{21}+R_{22})/(R_{21}-R_{22}) \le 100 \quad (10)$$

$$1.75 \le n_1 \le 1.9 \quad (11)$$

$$0.88 \le n_1/n_2 \le 1.1 \quad (12)$$

$$0.1 \le (f_1/f)/NA_{ob} \le 2.5 \quad (13)$$

Here, $h_{max}$ is a maximum value of the height of an axial marginal ray in the objective. $NA_{ob}$ is a numerical aperture of the objective. $R_{21}$ is a radius of curvature of a lens surface on the object side of the second meniscus lens. $R_{22}$ is a radius of curvature of a lens surface on the image side of the second meniscus lens. $D_{o21}$ is a distance on the optical axis from a focal plane of the objective to the lens surface on the object side of the second meniscus lens. $n_1$ is a refractive index of the first meniscus lens. $n_2$ is a refractive index of the second meniscus lens. $f_1$ is a focal length of the first lens component. The focal plane of the objective is a light collecting plane when a collimated pencil of light enters from the image side, and is also referred to as an object plane because it is usually the same as a surface on the object side of a cover glass.

Conditional Expression (7) is a conditional expression that is primarily used to favorably correct a field curvature. It is possible to favorably correct a field curvature while configuring the objective so as to not become larger than a predetermined size, by satisfying Conditional Expression (7) together with Conditional Expression (2). It is possible to prevent the height of a marginal ray from becoming too great by preventing $(h_{max}/f) \times NA_{ob}$ from exceeding the upper limit, and this results in being able to reduce the occurrence of aberrations such as a spherical aberration and a coma. Further, it is possible to maintain a sufficient height of the marginal ray in the first lens group by preventing $(h_{max}/f) \times NA_{ob}$ from falling below the lower limit, and this results in being able to make the height of the marginal ray in the second lens group relatively small. Thus, it is possible to correct a field curvature more effectively.

Conditional Expression (8) is a conditional expression that is primarily used to favorably correct a field curvature. It is possible to favorably correct a field curvature while configuring the objective so as to not become larger than a predetermined size, by satisfying Conditional Expression (8). It is possible to make the height of the marginal ray in the second lens group sufficiently small by preventing $((h_{max}-h_{min})/f) \times NA_{ob}$ from exceeding the upper limit. Thus, it is possible to correct the Petzval sum in the second lens group effectively, which results in being able to favorably correct a field curvature in a wide field. Further, it is possible to prevent the height of the marginal ray in the second lens group from becoming too small by preventing $((h_{max}-h_{min})/f) \times NA_{ob}$ from falling below the lower limit. Thus, it is possible to prevent the second lens group from becoming too large. This results in adequately suppressing the divergence of a pencil of light near an edge of the objective, so there is no need for a very strong positive refractive power when the pencil of light is converted into a collimated beam at the edge of the objective. Thus, it is possible to reduce a coma that occurs when a pencil of light is converted into a collimated beam.

Conditional Expression (9) is a conditional expression that is primarily used to favorably correct a spherical aberration, an axial chromatic aberration, and a coma. It is possible to favorably correct these aberrations by satisfying Conditional Expression (9). It is possible to prevent an absolute value of a negative radius of curvature of the lens surface on the object side of the second meniscus lens from becoming too small by preventing $R_{21}/D_{o21}$ from exceeding the upper limit. Thus, it is possible to prevent an incident angle at which a light ray enters the second meniscus lens from becoming too large, which results in being able to suppress the occurrence of a spherical aberration and a coma. Further, it is possible to prevent a pencil of light on the lens surface on the object side of the second meniscus lens from further diverging by preventing $R_{21}/D_{o21}$ from falling below the lower limit. Thus, it is possible to prevent the height of a light ray in subsequent portions in the optical system from becoming too high, which results in being able to suppress the occurrence of a spherical aberration and a coma in the subsequent portions in the optical system.

Conditional Expression (10) is a conditional expression that is primarily used to favorably correct a spherical aberration, an axial chromatic aberration, and a coma. It is possible to favorably correct these aberrations by satisfying Conditional Expression (10). $(R_{21}+R_{22})/(R_{21}-R_{22})$ represents a shape factor of the second meniscus lens. It is possible to prevent the second meniscus lens from having an excessively curved shape by preventing $(R_{21}+R_{22})/(R_{21}-R_{22})$ from exceeding the upper limit, which results in being able to prevent the occurrence of an aberration due to a stress being applied to a lens when the lens is attached to a lens frame or when the lens is assembled. Further, the second meniscus lens has a sufficiently curved meniscus shape that has a concave surface facing the object side when $(R_{21}+R_{22})/(R_{21}-R_{22})$ does not fall below the lower limit. Thus, it is possible to prevent an incident angle at which a light ray enters the second meniscus lens from becoming too large, which results in being able to suppress the occurrence of a spherical aberration and a coma.

Conditional Expression (11) is a conditional expression that is primarily used to favorably correct a high-order spherical aberration, a high-order coma, and a lateral chromatic aberration. It is possible to favorably correct these aberrations by satisfying Conditional Expression (11). In general, a glass material having a high refractive index has a high dispersivity. In view of this, it is possible to prevent a highly dispersive glass material from being arranged on the object side by preventing $n_1$ from exceeding the upper limit, which results in being able to reduce the occurrence of a lateral chromatic aberration. Further, it is possible to obtain a predetermined positive refractive power while preventing a radius of curvature on a lens surface on the image side of the first lens component from becoming too small, by preventing $n_1$ from falling below the lower limit. This results in being able to suppress the occurrence of a high-order spherical aberration and a high-order coma in the entire optical system. Further, when the objective is an immersion objective, it is possible to make a difference in a refractive index on a lens surface on the object side of the first meniscus lens large, which results in being able to correct the Petzval sum effectively.

Conditional Expression (12) is a conditional expression that defines a range of a refractive index ratio of the first meniscus lens to the second meniscus lens. The first meniscus lens and the second meniscus lens are respectively made of glass materials that have similar optical characteristics to each other, by satisfying Conditional Expression (12). Thus, it is possible to provide an effect to suppress the divergence of a light ray to the first meniscus lens and the second meniscus lens in a well-balanced manner. This results in being able to favorably correct aberrations.

Conditional Expression (13) is a conditional expression that is primarily used to favorably correct a spherical aberration, an axial chromatic aberration, and a coma. It is possible to favorably correct these aberrations by satisfying Conditional Expression (13). It is possible to prevent the refractive power of the first lens component from becoming too weak by preventing $(f_1/f)/NA_{ob}$ from exceeding the upper limit, which results in being able to sufficiently reduce the divergence of a pencil of light emitted from the first lens component. Thus, it is possible to prevent the height of a light ray from becoming too great when the light ray enters subsequent portions in the optical system. This results in also being able to favorably correct a spherical aberration and a coma in an objective with a high NA. Further, it is possible to prevent the refractive power of the first lens component from becoming too strong by preventing $(f_1/f)/NA_{ob}$ from falling below the lower limit. Thus, it is possible to prevent the height of the light ray from becoming too small in the subsequent portions in the optical system, which results in being able to favorably correct an axial chromatic aberration in the subsequent portions in the optical system.

The objective may be configured to satisfy one of Conditional Expression (7-1) to Conditional Expression (7-3) below instead of Conditional Expression (7). Further, the objective may be configured to satisfy one of Conditional Expression (8-1) to Conditional Expression (8-3) below instead of Conditional Expression (8). Furthermore, the objective may be configured to satisfy one of Conditional Expression (9-1) to Conditional Expression (9-3) below instead of Conditional Expression (9). Moreover, the objective may be configured to satisfy one of Conditional Expression (10-1) to Conditional Expression (10-3) below instead of Conditional Expression (10). Further, the objective may be configured to satisfy one of Conditional Expression (13-1) to Conditional Expression (13-3) below instead of Conditional Expression (13).

$$2.7 \leq h_{max}/NA_{ob} \leq 6 \quad (7\text{-}1)$$

$$3.5 \leq h_{max}/NA_{ob} \leq 5 \quad (7\text{-}2)$$

$$4 \leq h_{max}/NA_{ob} \leq 4.5 \quad (7\text{-}3)$$

$$1.4 \leq ((h_{max}-h_{min})/f) \times NA_{ob} \leq 3.4 \quad (8\text{-}1)$$

$$2.3 \leq ((h_{max}-h_{min})/f) \times NA_{ob} \leq 3.2 \quad (8\text{-}2)$$

$$2.5 \leq ((h_{max}-h_{min})/f) \times NA_{ob} \leq 3 \quad (8\text{-}3)$$

$$-2.67 \leq R_{21}/D_{o21} \leq -1 \quad (9\text{-}1)$$

$$-2.34 \leq R_{21}/D_{o21} \leq -1.1 \quad (9\text{-}2)$$

$$-2.18 \leq R_{21}/D_{o21} \leq -1.2 \quad (9\text{-}3)$$

$$3.6 \leq (R_{21}+R_{22})/(R_{21}-R_{22}) \leq 80 \quad (10\text{-}1)$$

$$4.4 \times (R_{21}+R_{22})/(R_{21}-R_{22}) \leq 50 \quad (10\text{-}2)$$

$$5.5 \leq (R_{21}+R_{22})/(R_{21}-R_{22}) \leq 25 \quad (10\text{-}3)$$

$$0.3 \leq (f_1/f)/NA_{ob} \leq 2 \quad (13\text{-}1)$$

$$0.7 \leq (f_1/f)/NA_{ob} \leq 1.7 \quad (13\text{-}2)$$

$$1 \leq (f_1/f)/NA_{ob} \leq 1.3 \quad (13\text{-}3)$$

Examples of the objective described above are described below.

FIRST EXAMPLE

FIG. 1 is a cross-sectional view of an objective 1 according to the present example. The objective 1 is a microscope immersion objective that includes a first lens group G1 that has a positive refractive power and converts a divergent pencil of light from an object point into a convergent pencil of light, and a second lens group G2 that has a negative refractive power and is arranged closer to the image side than the first lens group G1.

The first lens group G1 includes, in order from the object side, a cemented lens CL1 (first lens component) that has a flat surface facing the object side, a meniscus lens L3 (second lens component) that has a positive refractive power and has a concave surface facing the object side, and a cemented lens CL2.

The cemented lens CL1 arranged closest to the object side is a first lens component, and includes a plano-convex lens L1 that has a flat surface facing the object side, and a meniscus lens L2 (first meniscus lens) that has a concave surface facing the object side. The meniscus lens L3 (second meniscus lens, third meniscus lens) is a second lens component that is arranged adjacent to the cemented lens CL1 at the image side of the cemented lens CL1, and has a positive refractive power. The cemented lens CL2 is a first achromatic lens component that includes three-piece cemented lens that are arranged in order of positive lens, negative lens, and positive lens, and includes a biconvex lens L4, a meniscus lens L5 (first negative lens) that has a concave surface facing the object side, and a meniscus lens L6 that has a concave surface facing the object side.

The second lens group G2 includes, in order from the object side, a cemented lens CL3, a biconvex lens L10, a cemented lens CL4 that has a meniscus shape that has a concave surface facing the image side, and a cemented lens CL5 that has a meniscus shape that has a concave surface facing the object side.

The cemented lens CL3 is a second achromatic lens component that includes three-piece cemented lens that are arranged in order of negative lens, positive lens, and negative lens, and includes a meniscus lens L7 (second negative lens) that has a concave surface facing the image side, a biconvex lens L8, and a meniscus lens L9 that has a concave surface facing the object side. The cemented lens CL3 is arranged near the first lens group G1, specifically at a position in which the distance on an optical axis between a lens surface s12 that is a lens surface of the first lens group G1 that is situated closest to the image side and a lens surface s13 that is a lens surface of the cemented lens CL3 that is situated closest to the object side is less than the thickness of the cemented lens CL3 on the optical axis. The cemented lens CL4 includes a biconvex lens L11 and a biconcave lens L12. The cemented lens CL5 includes a meniscus lens L13 that has a concave surface facing the object side and a meniscus lens L14 that has a concave surface facing the object side.

The following is lens data of the objective 1. INF in the lens data represents infinity ($\infty$).

| Objective 1 | | | | |
|---|---|---|---|---|
| s | r | d | nd | vd |
| 1 | INF | 0 | | |
| 2 | INF | 0.17 | 1.52397 | 54.41 |
| 3 | INF | 0.152 | 1.51495 | 41 |
| 4 | INF | 0.756 | 1.51633 | 64.14 |
| 5 | −3.0323 | 3.649 | 1.883 | 40.76 |
| 6 | −3.3067 | 0.1 | | |
| 7 | −10 | 1.306 | 1.883 | 40.76 |
| 8 | −7.6719 | 0.15 | | |
| 9 | 13.0236 | 7.376 | 1.43875 | 94.93 |
| 10 | −8.042 | 0.573 | 1.738 | 32.26 |
| 11 | −28.0828 | 3.659 | 1.43875 | 94.93 |
| 12 | −10.2544 | 0.311 | | |
| 13 | 45.4925 | 0.565 | 1.63775 | 42.41 |
| 14 | 14.4615 | 7.275 | 1.43875 | 94.93 |
| 15 | −7.8092 | 0.564 | 1.63775 | 42.41 |
| 16 | −32.0204 | 0.25 | | |
| 17 | 12.2183 | 5.141 | 1.43875 | 94.93 |
| 18 | −24.5259 | 0.15 | | |
| 19 | 6.3796 | 5.386 | 1.43875 | 94.93 |
| 20 | −12.7768 | 0.578 | 1.63775 | 42.41 |
| 21 | 3.7146 | 4.272 | | |
| 22 | −3.3463 | 4.361 | 1.7725 | 49.6 |
| 23 | −11.08 | 2.719 | 1.7847 | 26.29 |
| 24 | −7.3475 | | | | s represents a surface number, r represents a radius of curvature (mm), d represents a surface interval (mm), nd represents a refractive index with respect to a d line, and vd represents an Abbe number. These symbols are also used in examples described subsequently. Surface numbers s1 and s2 represent an object surface that is a surface on the object side of a cover glass CG. Surfaces represented by surface numbers s3, s4, and s24 are a surface on the image side of the cover glass CG, a lens surface of the objective 1 that is situated closest to the object side, and a lens surface of the objective 1 that is situated closest to the image side, respectively. A refractive index nd3 represents a refractive index of an immersion liquid IM. Further, for example, a surface interval d1 represents a distance on the optical axis between the surface represented by the surface number s1 and the surface represented by the surface number s2.

The following is various data of the objective 1. β is a magnification of the objective, FN is a field number, and WD is a working distance. The other parameters are as described above.

β=60, FN=22, WD=0.152 mm, $d_{o1}$=0.573 mm, $h_{o1}$=6.942 mm, $h_{min}$=2.363 mm, $h_f$=4.37 mm, L=49.139 mm, f=3 mm, $d_{o2}$=0.565 mm, $h_{o2}$=7.314 mm, $d_{m1}$=1.306 mm, $h_{m1}$=5.024 mm, $h_{max}$=8.072 mm, $NA_{ob}$=1.5, $R_{21}$=−10 mm, $D_{o21}$=4.827 mm, $R_{22}$=−7.6719 mm, $n_1$=1.883, $n_2$=1.883, $f_1$=4.792 mm The objective 1 satisfies Conditional Expression (1) to Conditional Expression (13) as described below.

$$d_{o1}/h_{o1}=0.083 \tag{1}$$

$$h_{min}/h_f=0.54 \tag{2}$$

$$L=49.139 \text{ mm} \tag{3}$$

$$L/f=16.4 \tag{4}$$

$$d_{o2}/h_{o2}=0.077 \tag{5}$$

$$d_{m1}/h_{m1}=0.26 \tag{6}$$

$$(h_{max}/f) \times NA_{ob}=4.04 \tag{7}$$

$$((h_{max}-h_{min})/f) \times NA_{ob}=2.85 \tag{8}$$

$$R_{21}/D_{o21}=-2.07 \tag{9}$$

$$(R_{21}+R_{22})/(R_{21}-R_{22})=7.59 \tag{10}$$

$$n_1=1.883 \tag{11}$$

$$n_1/n_2=1 \tag{12}$$

$$(f_1/f)/NA_{ob}=1.06 \tag{13}$$

FIG. 2 is a cross-sectional view of a tube lens 10 used in combination with the objective 1. The tube lens 10 is a microscope tube lens that forms a magnified image of an object in combination with an infinity-corrected objective. The tube lens 10 is a cemented lens CL1 that includes a biconvex lens L1 and a meniscus lens L2 that is arranged at the image side of the biconvex lens L1 and has a concave surface facing the object side. The tube lens 10 is arranged such that the distance on an optical axis between the lens surface s24 that is a lens surface of the objective 1 that is situated closest to the image side and a lens surface s1 that is a lens surface of the tube lens 10 that is situated closest to the object side is 133 mm. The focal length of the tube lens 10 is 180 mm.

The following is lens data of the tube lens 10.

| Tube lens 10 | | | | |
|---|---|---|---|---|
| s | r | d | nd | vd |
| 1 | 193.123 | 5.5 | 1.48749 | 70.23 |
| 2 | −61.238 | 4.6 | 1.72047 | 34.71 |
| 3 | −105.391 | | | |

Figure 3:
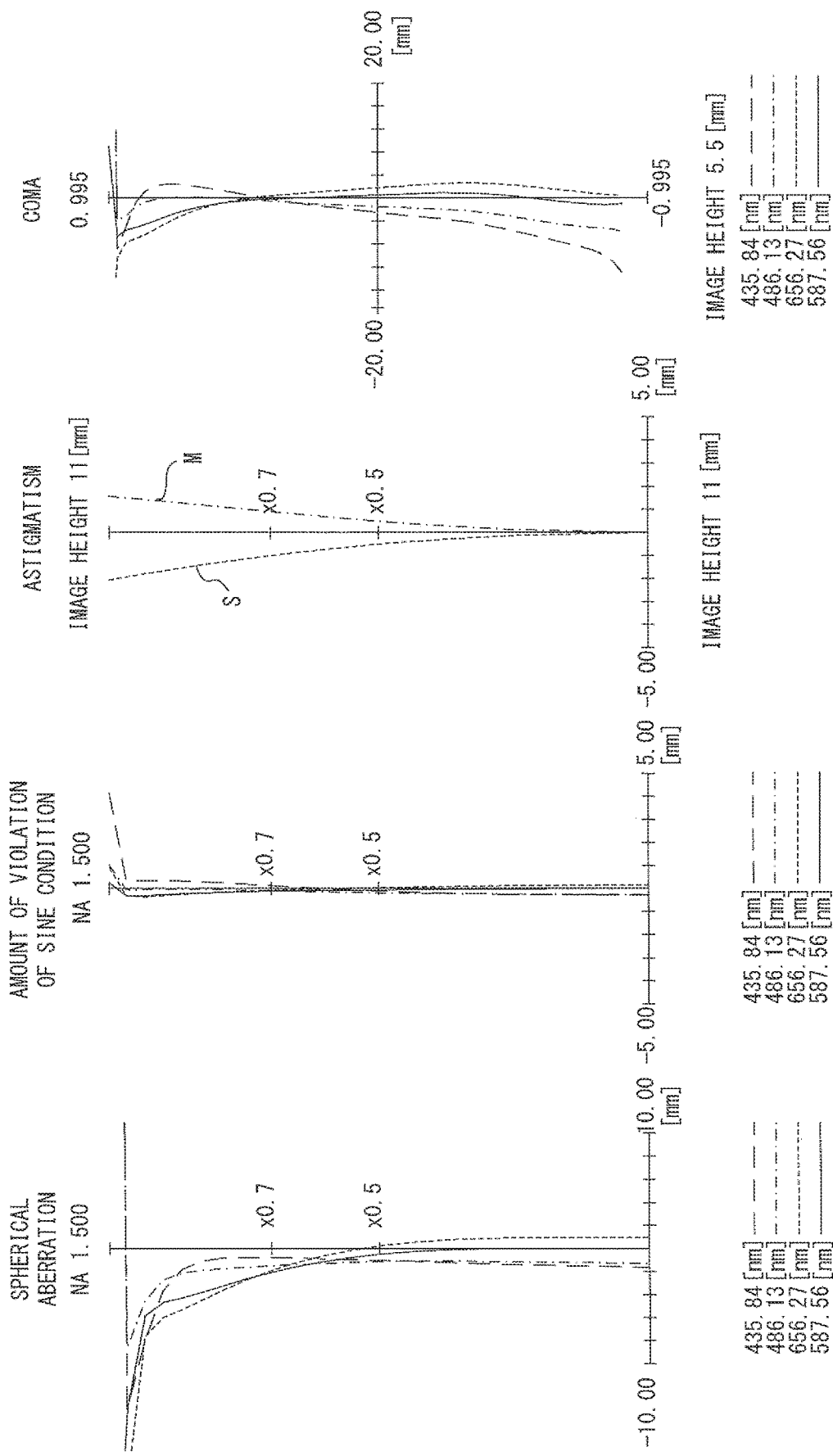
FIGS. 3A to 3D are diagrams of an aberration in an optical system that includes the objective 1 and the tube lens 10.

FIGS. 3A to 3D are diagrams of an aberration in an optical system that includes the objective 1 and the tube lens 10. These diagrams illustrate aberrations in an image plane formed by the objective 1 and the tube lens 10. FIG. 3A is a spherical aberration diagram, FIG. 3B illustrates an amount of violation of the sine condition, FIG. 3C is an astigmatism diagram, and FIG. 3D is a coma diagram. In the figures, "M" represents a meridional component and "S" represents a sagittal component. As illustrated in FIGS. 3A to 3D, the aberrations are favorably corrected in a wide field in the present example.

SECOND EXAMPLE

Figure 4:
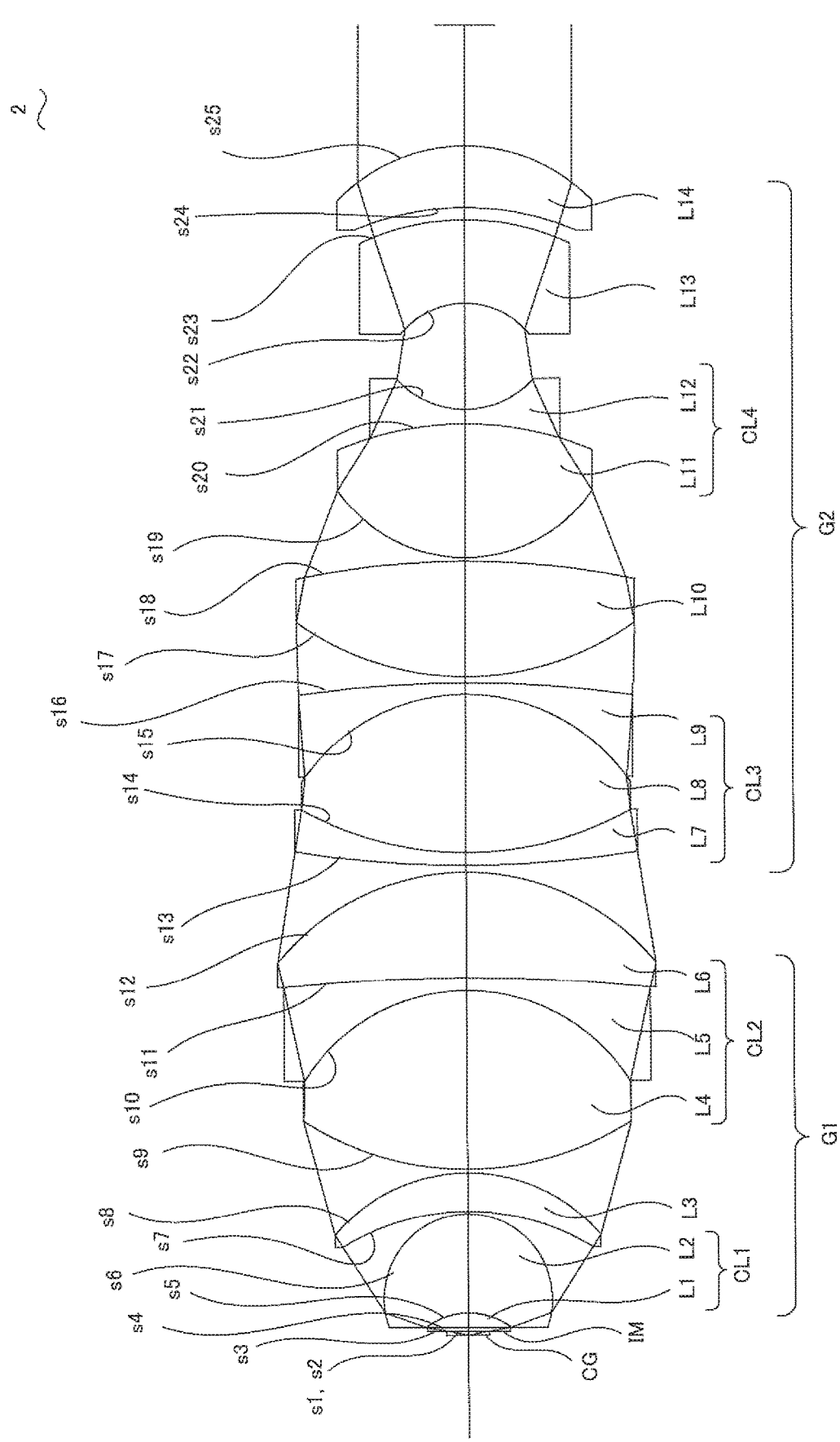
FIG. 4 is a cross-sectional view of an objective 2 according to a second example.

FIG. 4 is a cross-sectional view of an objective 2 according to the present example. The objective 2 is a microscope immersion objective that includes a first lens group G1 that has a positive refractive power and converts a divergent pencil of light from an object point into a convergent pencil of light, and a second lens group G2 that has a negative refractive power and is arranged closer to the image side than the first lens group G1.

The first lens group G1 includes, in order from the object side, a cemented lens CL1 (first lens component) that has a flat surface facing the object side, a meniscus lens L3 (second lens component) that has a positive refractive power and has a concave surface facing the object side, and a cemented lens CL2.

The cemented lens CL1 arranged closest to the object side is a first lens component, and includes a plano-convex lens L1 that has a flat surface facing the object side, and a meniscus lens L2 (first meniscus lens) that has a concave surface facing the object side. The meniscus lens L3 (second meniscus lens, third meniscus lens) is a second lens component that is arranged adjacent to the cemented lens CL1 at the image side of the cemented lens CL1, and has a positive refractive power. The cemented lens CL2 is a first achromatic lens component that includes three-piece cemented lens that are arranged in order of positive lens, negative lens, and positive lens, and includes a biconvex lens L4, a meniscus lens L5 (first negative lens) that has a concave surface facing the object side, and a meniscus lens L6 that has a concave surface facing the object side.

The second lens group G2 includes, in order from the object side, a cemented lens CL3, a biconvex lens L10, a cemented lens CL4 that has a meniscus shape that has a concave surface facing the image side, a meniscus lens L13 that has a concave surface facing the object side, and a meniscus lens L14 that has a concave surface facing the object side.

The cemented lens CL3 is a second achromatic lens component that includes three-piece cemented lens that are arranged in order of negative lens, positive lens, and negative lens, and includes a meniscus lens L7 (second negative lens) that has a concave surface facing the image side, a biconvex lens L8, and a meniscus lens L9 that has a concave surface facing the object side. The cemented lens CL3 is arranged near the first lens group G1, specifically at a position in which the distance on an optical axis between a lens surface s12 that is a lens surface of the first lens group G1 that is situated closest to the image side and a lens surface s13 that is a lens surface of the cemented lens CL3 that is situated closest to the object side is less than the thickness of the cemented lens CL3 on the optical axis. The cemented lens CL4 includes a biconvex lens L11 and a biconcave lens L12.

The following is lens data of the objective 2.

Objective 2

| s | r | d | nd | vd |
|---|---|---|---|---|
| 1 | INF | 0 | | |
| 2 | INF | 0.17 | 1.52397 | 54.41 |
| 3 | INF | 0.143 | 1.51495 | 41 |
| 4 | INF | 0.6 | 1.51633 | 64.14 |
| 5 | −2.9657 | 4.088 | 1.883 | 40.76 |
| 6 | −3.4989 | 0.1 | | |
| 7 | −10 | 1.597 | 1.883 | 40.76 |
| 8 | −7.2578 | 0.15 | | |
| 9 | 12.6465 | 7.37 | 1.43875 | 94.93 |
| 10 | −8.042 | 0.523 | 1.738 | 32.26 |
| 11 | −75.5769 | 4.357 | 1.43875 | 94.93 |
| 12 | −10.1926 | 0.283 | | |
| 13 | 45.2348 | 0.523 | 1.63775 | 42.41 |
| 14 | 14.1108 | 6.542 | 1.43875 | 94.93 |
| 15 | −8.2794 | 0.475 | 1.63775 | 42.41 |
| 16 | −48.0863 | 0.25 | | |
| 17 | 12.1423 | 4.759 | 1.43875 | 94.93 |
| 18 | −34.4139 | 0.15 | | |
| 19 | 6.4418 | 5.523 | 1.43875 | 94.93 |
| 20 | −13.6512 | 0.597 | 1.63775 | 42.41 |
| 21 | 3.8526 | 4.37 | | |
| 22 | −3.4655 | 3.461 | 1.7725 | 49.6 |
| 23 | −10.3549 | 0.5 | | |
| 24 | −12 | 2.536 | 1.80518 | 25.42 |
| 25 | −7.3961 | | | |

Surfaces represented by surface numbers s4 and s25 are a lens surface of the objective 2 that is situated closest to the object side and a lens surface of the objective 2 that is situated closest to the image side, respectively.

The following is various data of the objective 2.

β-60, FN-22, WD-0.143 mm, $d_{o1}$-0.523 mm, $h_{o1}$-6.858 mm, $h_{min}$=2.519 mm, $h_f$=4.532 mm, L=48.755 mm, f=3.003 mm, $d_{o2}$=0.523 mm, $h_{o2}$=7.181 mm, $d_{m1}$=1.597 mm, $h_{m1}$=5.258 mm, $h_{max}$=7.973 mm, $NA_{ob}$=1.5, $R_{21}$=−10 mm, $D_{o21}$=5.101 mm, $R_{22}$=−7.2578 mm, $n_1$=1.883, $n_2$=1.883, $f_1$=5.09 mm The objective 2 satisfies Conditional Expression (1) to Conditional Expression (13) as described below.

$$d_{o1}/h_{o1}=0.076 \tag{1}$$

$$h_{min}/h_f=0.56 \tag{2}$$

$$L=48.755 \text{ mm} \tag{3}$$

$$L/f=16.2 \tag{4}$$

$$d_{o2}/h_{o2}=0.073 \tag{5}$$

$$d_{m1}/h_{m1}=0.30 \tag{6}$$

$$(h_{max}/f) \times NA_{ob}=3.98 \tag{7}$$

$$((h_{max}-h_{min})/f) \times NA_{ob}=2.72 \tag{8}$$

$$R_{21}/D_{o21}=-1.96 \tag{9}$$

$$(R_{21}+R_{22})/(R_{21}-R_{22})=6.29 \tag{10}$$

$$n_1=1.883 \tag{11}$$

$$n_1/n_2=1 \tag{12}$$

$$(f1/f)/NA_{ob}-1.13 \tag{13}$$

Figure 5:
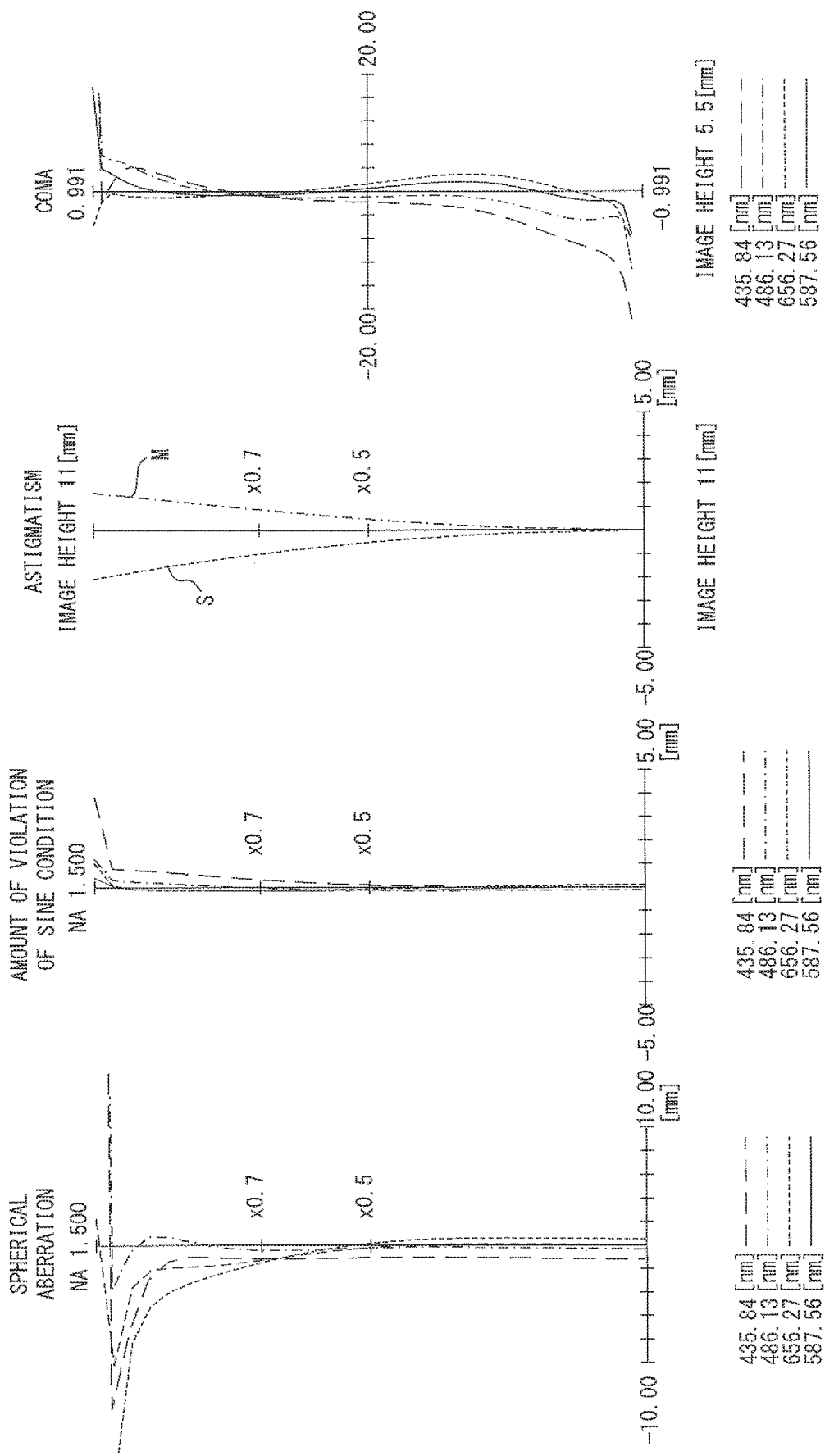
FIGS. 5A to 5D are diagrams of an aberration in an optical system that includes the objective 2 and the tube lens 10.

FIGS. 5A to 5D are diagrams of an aberration in an optical system that includes the objective 2 and the tube lens 10. These diagrams illustrate aberrations in an image plane formed by the objective 2 and the tube lens 10. The tube lens 10 is arranged such that the distance on an optical axis between the lens surface s25 that is a lens surface of the objective 2 that is situated closest to the image side and the lens surface s1 that is a lens surface of the tube lens 10 that is situated closest to the object side is 133 mm. FIG. 5A is a spherical aberration diagram, FIG. 5B illustrates an amount of violation of the sine condition, FIG. 5C is an astigmatism diagram, and FIG. 5D is a coma diagram. As illustrated in FIGS. 5A to 5D, the aberrations are favorably corrected in a wide field in the present example.

THIRD EXAMPLE

Figure 6:
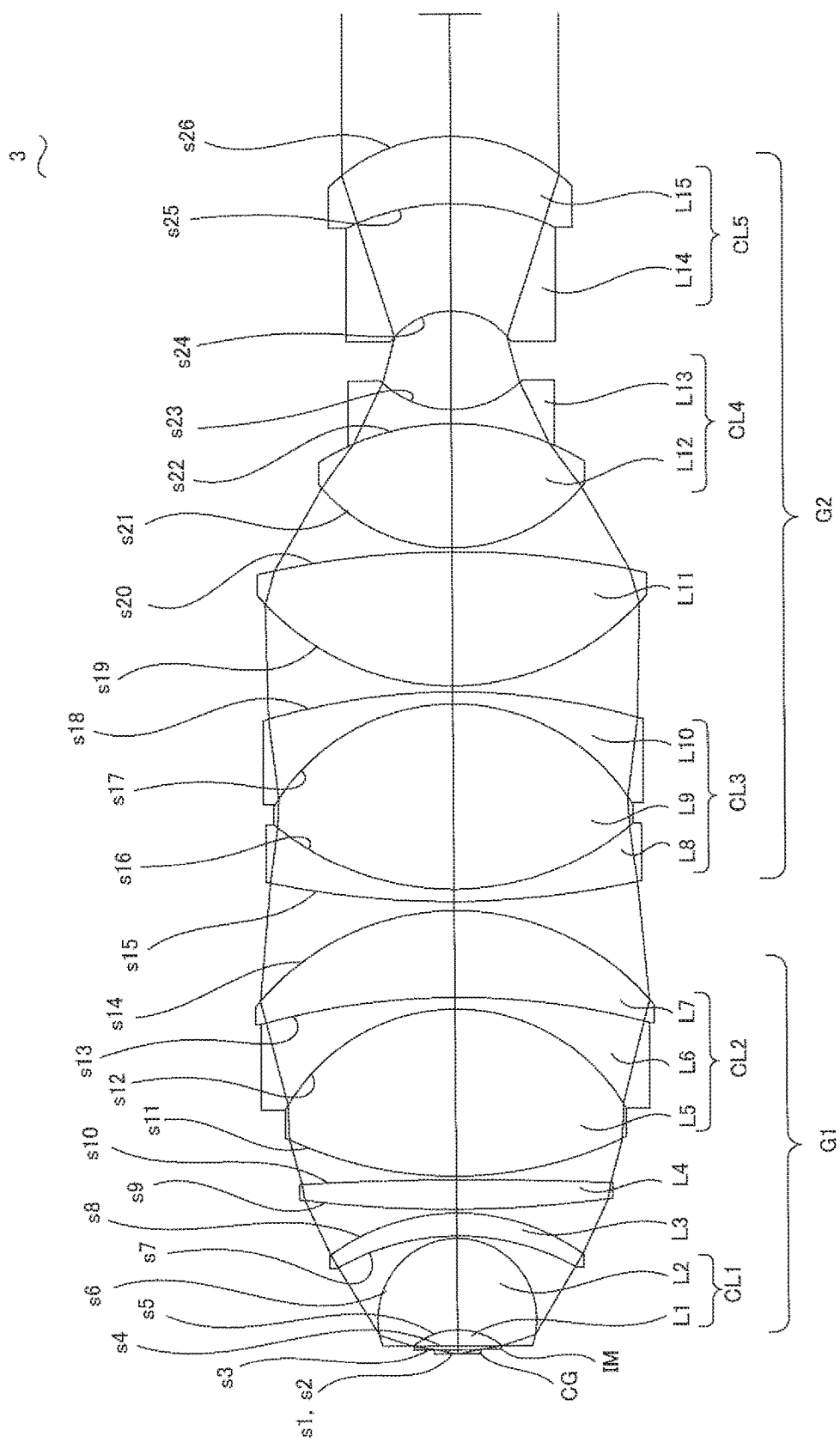
FIG. 6 is a cross-sectional view of an objective 3 according to a third example.

FIG. 6 is a cross-sectional view of an objective 3 according to the present example. The objective 3 is a microscope immersion objective that includes a first lens group G1 that has a positive refractive power and converts a divergent pencil of light from an object point into a convergent pencil of light, and a second lens group G2 that has a negative refractive power and is arranged closer to the image side than the first lens group G1.

The first lens group G1 includes, in order from the object side, a cemented lens CL1 (first lens component) that has a flat surface facing the object side, a meniscus lens L3 (second lens component) that has a positive refractive power and has a concave surface facing the object side, a biconvex lens L4, and a cemented lens CL2.

The cemented lens CL1 arranged closest to the object side is a first lens component, and includes a plano-convex lens L1 that has a flat surface facing the object side, and a meniscus lens L2 (first meniscus lens) that has a concave surface facing the object side. The meniscus lens L3 (second meniscus lens, third meniscus lens) is a second lens component that is arranged adjacent to the cemented lens CL1 at the image side of the cemented lens CL1, and has a positive refractive power. The cemented lens CL2 is a first achromatic lens element that includes three-piece cemented lens that are arranged in order of positive lens, negative lens, and positive lens, and includes a biconvex lens L5, a meniscus lens L6 (first negative lens) that has a concave surface facing the object side, and a meniscus lens L7 that has a concave surface facing the object side.

The second lens group G2 includes, in order from the object side, a cemented lens CL3, a biconvex lens L11, a cemented lens CL4 that has a meniscus shape that has a concave surface facing the image side, and a cemented lens CL5 that has a meniscus shape that has a concave surface facing the object side.

The cemented lens CL3 is a second achromatic lens component that includes three-piece cemented lens that are arranged in order of negative lens, positive lens, and negative lens, and includes a meniscus lens L8 (second negative lens) that has a concave surface facing the image side, a biconvex lens L9, and a meniscus lens L10 that has a concave surface facing the object side. The cemented lens CL3 is arranged near the first lens group G1, specifically at a position in which the distance on an optical axis between a lens surface s14 that is a lens surface of the first lens group G1 that is situated closest to the image side and a lens surface s15 that is a lens surface of the cemented lens CL3 that is situated closest to the object side is less than the thickness of the cemented lens CL3 on the optical axis. The cemented lens CL4 includes a biconvex lens L12 and a biconcave lens L13. The cemented lens CL5 includes a meniscus lens L14 that has a concave surface facing the object side, and a meniscus lens L15 that has a concave surface facing the object side.

The following is lens data of the objective 3.

| Objective 3 | | | | |
|---|---|---|---|---|
| s | r | d | nd | vd |
| 1 | INF | 0 | | |
| 2 | INF | 0.17 | 1.52397 | 54.41 |
| 3 | INF | 0.144 | 1.51495 | 41 |
| 4 | INF | 0.667 | 1.51633 | 64.14 |
| 5 | −2.8462 | 3.705 | 1.883 | 40.76 |
| 6 | −3.2561 | 0.1 | | |
| 7 | −10 | 0.924 | 1.883 | 40.76 |
| 8 | −8.8357 | 0.15 | | |
| 9 | 49.7862 | 1.2 | 1.883 | 40.76 |
| 10 | −132.2999 | 0.15 | | |
| 11 | 16.1699 | 6.797 | 1.43875 | 94.93 |
| 12 | −8.042 | 0.474 | 1.738 | 32.26 |
| 13 | −30.4208 | 3.517 | 1.43875 | 94.93 |
| 14 | −10.5162 | 0.366 | | |
| 15 | 36.573 | 0.502 | 1.63775 | 42.41 |
| 16 | 11.4502 | 7.533 | 1.43875 | 94.93 |
| 17 | −8.6066 | 0.485 | 1.63775 | 42.41 |
| 18 | −27.1528 | 0.249 | | |
| 19 | 10.3799 | 5.468 | 1.43875 | 94.93 |
| 20 | −35.9049 | 0.15 | | |
| 21 | 7.0141 | 5.038 | 1.43875 | 94.93 |
| 22 | −10.4018 | 0.57 | 1.63775 | 42.41 |
| 23 | 4.175 | 4.018 | | |
| 24 | −3.1086 | 4.346 | 1.7725 | 49.6 |
| 25 | −9.9919 | 2.737 | 1.7847 | 26.29 |
| 26 | −7.1561 | | | |

Surfaces represented by surface numbers s4 and s26 are a lens surface of the objective 3 that is situated closest to the object side and a lens surface of the objective 3 that is situated closest to the image side, respectively.

The following is various data of the objective 3.

$\beta=60$, FN=22, WD=0.144 mm, $d_{o1}$=0.474 mm, $h_{o1}$=6.895 mm, $h_{min}$=2.336 mm, $h_f$=4.507 mm, L=49.143 mm, f=3.001 mm, $d_{o2}$=0.502 mm, $h_{o2}$=7.549 mm, $d_{m1}$=0.924 mm, $h_{m1}$=4.883 mm, $h_{max}$=8.009 mm, $NA_{ob}$=1.5, $R_{21}$=−10 mm, $D_{o21}$=4.786 mm, $R_{22}$=−8.8357 mm, $n_1$=1.883, $n_2$=1.883, $f_1$-4.737 mm The objective 3 satisfies Conditional Expression (1) to Conditional Expression (13) as described below.

$$d_{o1}/h_{o1}=0.069 \tag{1}$$

$$h_{min}/h_f=0.52 \tag{2}$$

$$L\text{-}49.143 \text{ mm} \tag{3}$$

$$L/f=16.4 \tag{4}$$

$$d_{o2}/h_{o2}=0.066 \tag{5}$$

$$d_{m1}/h_{m1}=0.19 \tag{6}$$

$$(h_{max}/f)\times NA_{ob}=4.00 \tag{7}$$

$$((h_{max}-h_{min})/f)\times NA_{ob}=2.84 \tag{8}$$

$$R_{21}/D_{o21}=-2.09 \tag{9}$$

$$(R_{21}+R_{22})/(R_{21}-R_{22})=16.18 \tag{10}$$

$$n_1=1.883 \tag{11}$$

$$n_1/n_2=1 \tag{12}$$

$$(f_1/f)/NA_{ob}\text{-}1.05 \tag{13}$$

Figures 7A, 7B, 7C, 7D:
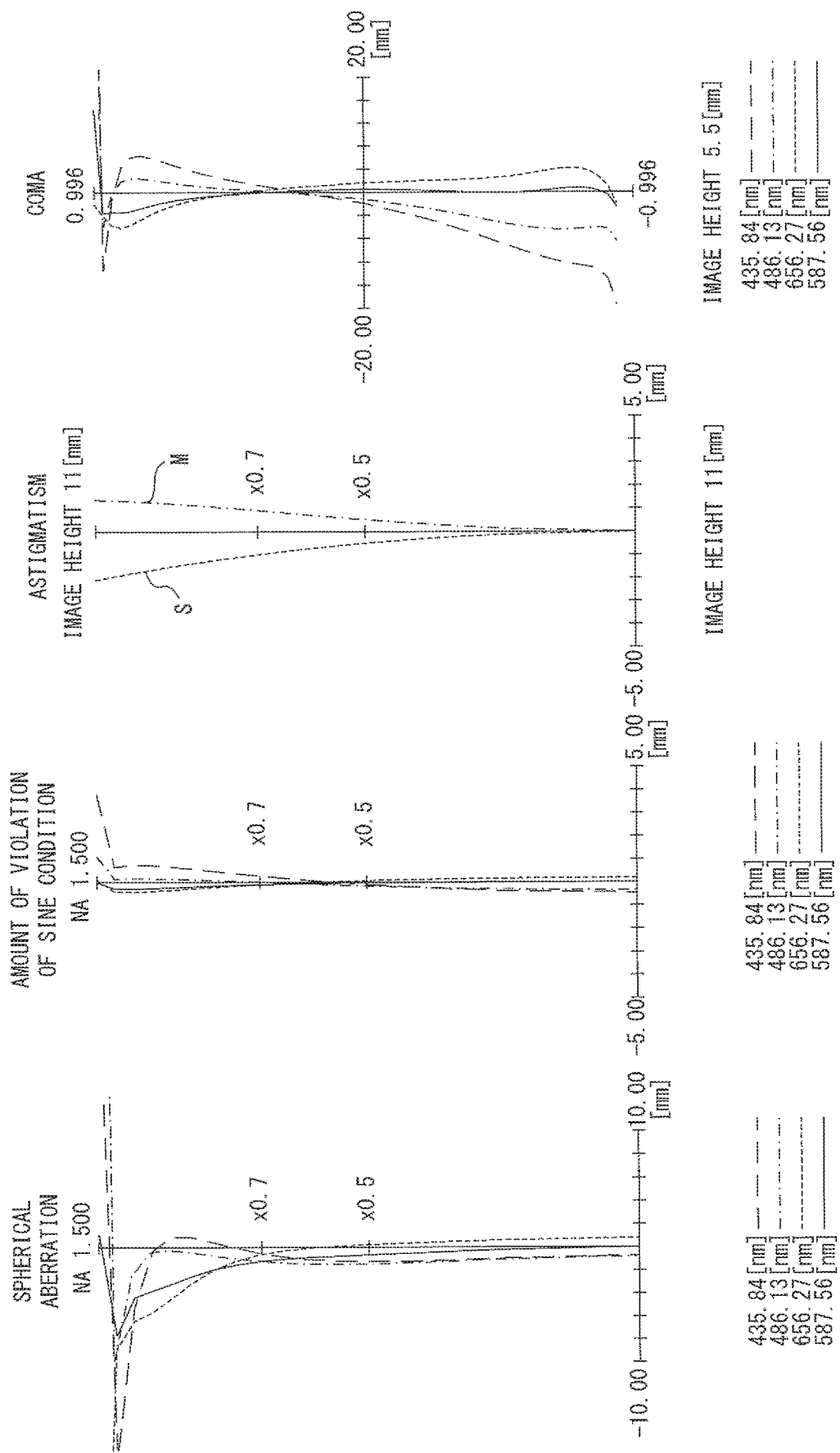
FIGS. 7A to 7D are diagrams of an aberration in an optical system that includes the objective 3 and the tube lens 10.

FIGS. 7A to 7D are diagrams of an aberration in an optical system that includes the objective 3 and the tube lens 10. These diagrams illustrate aberrations in an image plane formed by the objective 3 and the tube lens 10. The tube lens 10 is arranged such that the distance on an optical axis between the lens surface s26 that is a lens surface of the objective 3 that is situated closest to the image side and the lens surface s1 that is a lens surface of the tube lens 10 that is situated closest to the object side is 133 mm. FIG. 7A is a spherical aberration diagram, FIG. 7B illustrates an amount of violation of the sine condition, FIG. 7C is an astigmatism diagram, and FIG. 7D is a coma diagram. As illustrated in FIGS. 7A to 7D, the aberrations are favorably corrected in a wide field in the present example.

FOURTH EXAMPLE

Figure 8:
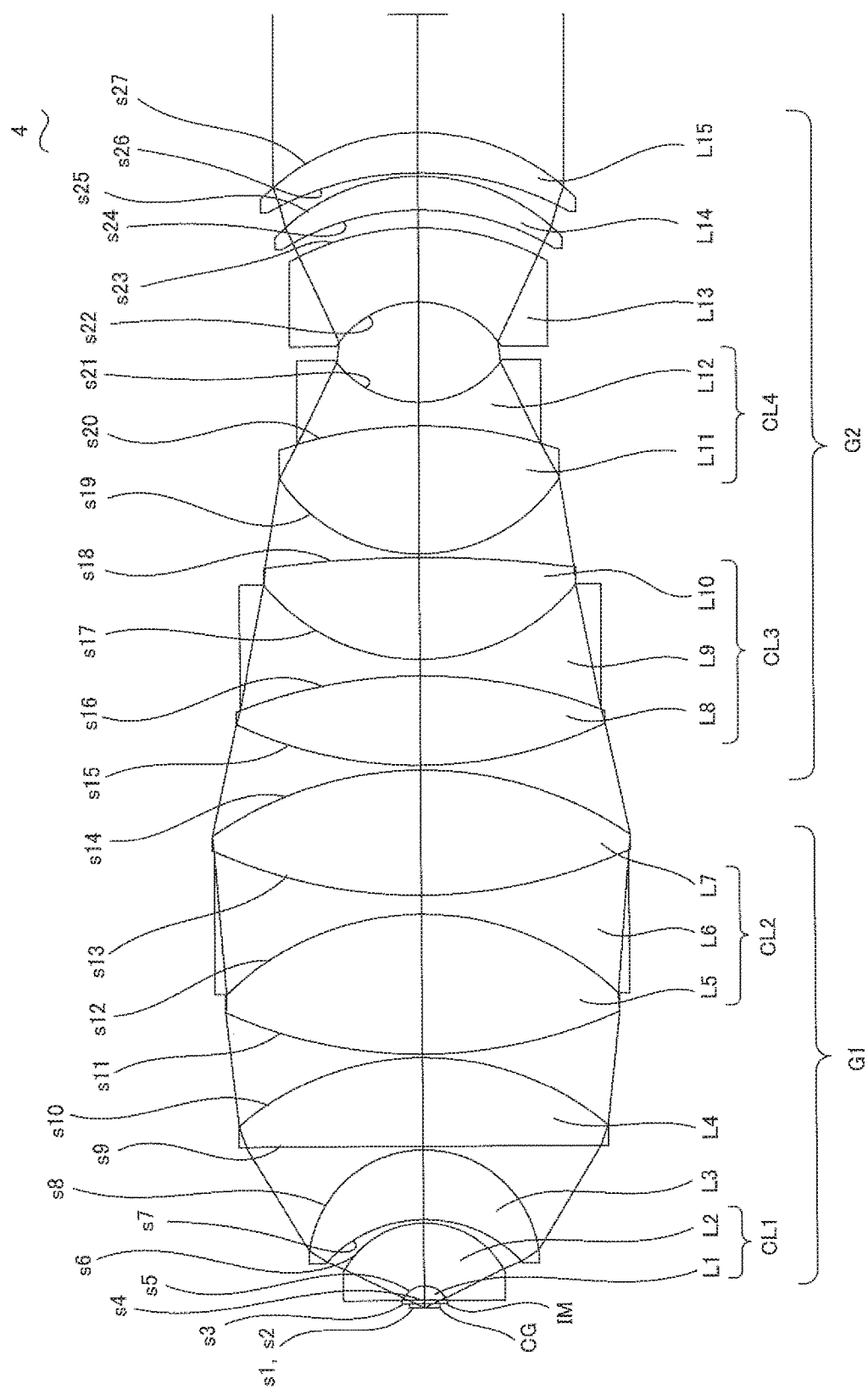
FIG. 8 is a cross-sectional view of an objective 4 according to a fourth example.

FIG. 8 is a cross-sectional view of an objective 4 according to the present example. The objective 4 is a microscope immersion objective that includes a first lens group G1 that has a positive refractive power and converts a divergent pencil of light from an object point into a convergent pencil of light, and a second lens group G2 that has a negative refractive power and is arranged closer to the image side than the first lens group G1.

The first lens group G1 includes, in order from the object side, a cemented lens CL1 (first lens component) that has a flat surface facing the object side, a meniscus lens L3 (second lens component) that has a positive refractive power and has a concave surface facing the object side, a meniscus lens L4 that has a concave surface facing the object side, and a cemented lens CL2.

The cemented lens CL1 arranged closest to the object side is a first lens component, and includes a plano-convex lens L1 that has a flat surface facing the object side, and a meniscus lens L2 (first meniscus lens) that has a concave surface facing the object side. The meniscus lens L3 (second meniscus lens) is a second lens component that is arranged adjacent to the cemented lens CL1 at the image side of the cemented lens CL1, and has a positive refractive power. The cemented lens CL2 is a first achromatic lens component that includes three-piece cemented lens that are arranged in order of positive lens, negative lens, and positive lens, and includes a biconvex lens L5, a biconcave lens L6 (first negative lens), and a biconvex lens L7.

The second lens group G2 includes, in order from the object side, a cemented lens CL3, a cemented lens CL4 that has a meniscus shape that has a concave surface facing the image side, a meniscus lens L13 that has a concave surface facing the object side, a meniscus lens L14 (third meniscus lens) that has a concave surface facing the object side, and a meniscus lens L15 that has a concave surface facing the object side.

The cemented lens CL3 is a second achromatic lens component that includes three-piece cemented lens that are arranged in order of positive lens, negative lens, and positive lens, and includes a biconvex lens L8, a biconcave lens L9 (second negative lens), and a biconvex lens L10. The cemented lens CL3 is arranged near the first lens group G1, specifically at a position in which the distance on an optical axis between a lens surface s14 that is a lens surface of the first lens group G1 that is situated closest to the image side and a lens surface s15 that is a lens surface of the cemented lens CL3 that is situated closest to the object side is less than the thickness of the cemented lens CL3 on the optical axis. The cemented lens CL4 includes a biconvex lens L11 and a biconcave lens L12.

The following is lens data of the objective 4.

Objective 4

| s | r | d | nd | vd |
|---|---|---|----|----|
| 1 | INF | 0 | | |
| 2 | INF | 0.17 | 1.52397 | 54.41 |
| 3 | INF | 0.157 | 1.51495 | 41 |
| 4 | INF | 0.6 | 1.51633 | 64.14 |
| 5 | −1.02 | 2.631 | 1.883 | 40.76 |
| 6 | −3.9162 | 0.15 | | |
| 7 | −5.7317 | 2.935 | 1.883 | 40.76 |
| 8 | −4.9331 | 0.15 | | |
| 9 | −2928.3365 | 3.75 | 1.56907 | 71.3 |
| 10 | −12.1444 | 0.15 | | |
| 11 | 20.6252 | 5.875 | 1.43875 | 94.93 |
| 12 | −12.0683 | 0.8 | 1.673 | 38.15 |
| 13 | 21.5942 | 5.284 | 1.56907 | 71.3 |
| 14 | −15.7804 | 0.2 | | |
| 15 | 18.4334 | 3.762 | 1.43875 | 94.93 |
| 16 | −21.3625 | 0.7 | 1.63775 | 42.41 |
| 17 | 8.5254 | 4.314 | 1.43875 | 94.93 |
| 18 | −50.5554 | 0.15 | | |
| 19 | 7.1635 | 5.372 | 1.56907 | 71.3 |
| 20 | −18.2659 | 1 | 1.63775 | 42.41 |
| 21 | 4.4581 | 4.233 | | |
| 22 | −4.2567 | 3.119 | 1.883 | 40.76 |
| 23 | −11.442 | 0.748 | | |
| 24 | −11.142 | 1.42 | 1.72916 | 54.68 |
| 25 | −8.595 | 0.15 | | |
| 26 | −13.348 | 1.691 | 1.84666 | 23.88 |
| 27 | −9.52 | | | |

Surfaces represented by surface numbers s4 and s27 are a lens surface of the objective 4 that is situated closest to the object side and a lens surface of the objective 4 that is situated closest to the image side, respectively.

The following is various data of the objective 4.

$\beta=40$, FN=26.5, WD=0.157 mm, $d_{o1}=0.7$ mm, $h_{o1}=7.684$ mm, $h_{min}=3.381$ mm, $h_f=6.183$ mm, L=49.185 mm, f=4.504 mm, $d_{o2}=0.8$ mm, $h_{o2}=8.324$ mm, $d_{m1}=1.42$ mm, $h_{m1}=5.343$ mm, $h_{max}=8.882$ mm, $NA_{ob}=1.38$, $R_{21}=-5.7317$ mm, $D_{o21}=3.708$ mm, $R_{22}=-4.9331$ mm, $n_1=1.883$, $n_2=1.883$, $f_1=-48.223$ mm The objective 4 satisfies Conditional Expression (1) to Conditional Expression (12) as described below.

$$d_{o1}/h_{o1}=0.091 \tag{1}$$

$$h_{min}/h_f=0.55 \tag{2}$$

$$L=49.185 \text{ mm} \tag{3}$$

$$L/f=10.9 \tag{4}$$

$$d_{o2}/h_{o2}=0.096 \tag{5}$$

$$d_{m1}/h_{m1}=0.27 \tag{6}$$

$$(h_{max}/f) \times NA_{ob}=2.72 \tag{7}$$

$$((h_{max}-h_{min})/f) \times NA_{ob}=1.69 \tag{8}$$

$$R_{21}/D_{o21}=-1.55 \tag{9}$$

$$(R_{21}+R_{22})/(R_{21}-R_{22})=-13.35 \tag{10}$$

$$n_1=1.883 \tag{11}$$

$$n_1/n_2=1 \tag{12}$$

$$(f_1/f)/NA_{ob}=-7.76 \tag{13}$$

FIGS. 9A to 9D are diagrams of an aberration in an optical system that includes the objective 4 and the tube lens 10. These diagrams illustrate aberrations in an image plane formed by the objective 4 and the tube lens 10. The tube lens 10 is arranged such that the distance on an optical axis between the lens surface s27 that is a lens surface of the objective 4 that is situated closest to the image side and the lens surface s1 that is a lens surface of the tube lens 10 that is situated closest to the object side is 133 mm. FIG. 9A is a spherical aberration diagram, FIG. 9B illustrates an amount of violation of the sine condition, FIG. 9C is an astigmatism diagram, and FIG. 9D is a coma diagram. As illustrated in FIGS. 9A to 9D, the aberrations are favorably corrected in a wide field in the present example.

What is claimed is:

1. An objective comprising:
a first lens group that has a positive refractive power and converts a divergent pencil of light from an object point into a convergent pencil of light; and
a second lens group that has a negative refractive power and is arranged closer to an image side than the first lens group,
wherein:
the objective includes a first negative lens, and
conditional expressions below $$0.005 \leq d_{o1}/h_{o1} \leq 0.1 \tag{1}$$

$$0.01 \leq h_{min}/h_f \leq 0.70 \tag{2-1)'}$$

$$10 \text{ mm} \leq L \leq 100 \text{ mm} \tag{3}$$

$$0.1 \leq L/f \leq 31 \tag{4}$$

are satisfied,
where $d_{o1}$ is a thickness of the first negative lens on an optical axis, $h_{o1}$ is a height of an axial marginal ray on a lens surface on an object side of the first negative lens, $h_{min}$ is a minimum value of a height of an axial marginal ray in the second lens group, $h_l$ is a height of an axial marginal ray on a lens surface of the objective that is situated closest to the image side, L is a length of the objective, and f is a focal length of the objective.

2. The objective according to claim 1, wherein:
the objective includes a second negative lens that is different from the first negative lens, and
a conditional expression below $$0.005 \leq d_{o2}/h_{o2} \leq 0.17 \tag{5}$$

is satisfied,
where $d_{o2}$ is a thickness of the second negative lens on the optical axis and $h_{o2}$ is a height of an axial marginal ray on a lens surface on the object side of the second negative lens.

3. The objective according to claim 2, wherein the first lens group includes a first achromatic lens component that includes a three-piece cemented lens.

4. The objective according to claim 3, wherein:
the second lens group includes a second achromatic lens element that includes a three-piece cemented lens, and
a distance on the optical axis between a lens surface of the first lens group that is situated closest to the image side and a lens surface of the second achromatic lens component that is closest to the object side is less than a thickness of the second achromatic lens component on the optical axis.

5. The objective according to claim 2, wherein:
the second lens group includes a second achromatic lens element that includes a three-piece cemented lens, and
a distance on the optical axis between a lens surface of the first lens group that is situated closest to the image side and a lens surface of the second achromatic lens component that is closest to the object side is less than a thickness of the second achromatic lens component on the optical axis.

6. The objective according to claim 2, wherein:
the objective includes a meniscus lens that has a positive refractive power, and
a conditional expression below $$0.02 \le d_{m1}/h_{m1} \le 0.45 \quad (6)$$

is satisfied,
where $d_{m1}$ is a thickness of the meniscus lens on the optical axis and $h_{m1}$ is a height of an axial marginal ray on a lens surface on the object side of the meniscus lens.

7. The objective according to claim 1, wherein the first lens group includes a first achromatic lens component that includes a three-piece cemented lens.

8. The objective according to claim 7, wherein:
the second lens group includes a second achromatic lens element that includes a three-piece cemented lens, and
a distance on the optical axis between a lens surface of the first lens group that is situated closest to the image side and a lens surface of the second achromatic lens component that is closest to the object side is less than a thickness of the second achromatic lens component on the optical axis.

9. The objective according to claim 7, wherein:
the objective includes a meniscus lens that has a positive refractive power, and
a conditional expression below $$0.02 \le d_{m1}/h_{m1} \le 0.45 \quad (6)$$

is satisfied,
where $d_{m1}$ is a thickness of the meniscus lens on the optical axis and $h_{m1}$ is a height of an axial marginal ray on a lens surface on the object side of the meniscus lens.

10. The objective according to claim 1, wherein:
the second lens group includes a second achromatic lens element that includes a three-piece cemented lens, and
a distance on the optical axis between a lens surface of the first lens group that is situated closest to the image side and a lens surface of the second achromatic lens component that is closest to the object side is less than a thickness of the second achromatic lens component on the optical axis.

11. The objective according to claim 1, wherein:
the objective includes a meniscus lens that has a positive refractive power, and
a conditional expression below $$0.02 \le d_{m1}/h_{m1} \le 0.45 \quad (6)$$

is satisfied,
where $d_{m1}$ is a thickness of the meniscus lens on the optical axis and $h_{m1}$ is a height of an axial marginal ray on a lens surface on the object side of the meniscus lens.

12. The objective according to claim 1, wherein a conditional expression below $$2.3 \le (h_{max}/f) \times NA_{ob} \le 6.5 \quad (7)$$

is satisfied,
where $h_{max}$ is a maximum value of a height of an axial marginal ray in the objective and $NA_{ob}$ is a numerical aperture of the objective.

13. The objective according to claim 1, wherein a conditional expression below $$0.7 \le ((h_{max} - h_{min})/f) \times NA_{ob} \le 3.6 \quad (8)$$

is satisfied,
where $h_{max}$ is a maximum value of a height of an axial marginal ray in the objective and $NA_{ob}$ is a numerical aperture of the objective.

14. The objective according to claim 1, wherein:
the first lens group includes a first lens component that is arranged closest to the object side and a second lens component that is arranged adjacent to the first lens component at the image side of the first lens group,
the first lens component includes a first meniscus lens that has a concave surface facing the object side, and
the second lens component includes a second meniscus lens that has a positive refractive power and has a concave surface facing the object side.

15. The objective according to claim 14, wherein a conditional expression below $$-3 \le R_{21}/D_{o21} - 0.8 \quad (9)$$

is satisfied,
where $R_{21}$ is a radius of curvature of a lens surface on the object side of the second meniscus lens and $D_{o21}$ is a distance on the optical axis from a focal plane of the objective to the lens surface on the object side of the second meniscus lens.

16. The objective according to claim 14, wherein a conditional expression below $$3.3 \le (R_{21} + R_{22})/(R_{21} - R_{22}) \le 100 \quad (10)$$

is satisfied,
where $R_{21}$ is a radius of curvature of the lens surface on the object side of the second meniscus lens and $R_{22}$ is a radius of curvature of a lens surface on the image side of the second meniscus lens.

17. The objective according to claim 14, wherein a conditional expression below $$1.75 \le n_1 \le 1.9 \quad (11)$$

is satisfied,
where $n_1$ is a refractive index of the first meniscus lens.

18. The objective according to claim 14, wherein a conditional expression below $$0.88 \le n_1/n_2 \le 1.1 \quad (12)$$

is satisfied,
where $n_1$ is a refractive index of the first meniscus lens and $n_2$ is a refractive index of the second meniscus lens.

19. An objective comprising:
a first lens group that has a positive refractive power, conducts a first conversion to convert a divergent pencil of light from an object into a convergent pencil of light, and emits the convergent pencil of light, the first conversion being a conversion that is conducted closest to an object among conversions from a divergent pencil of light into a convergent pencil of light; and a second lens group that has a negative refractive power and is arranged closer to an image side than the first lens group, wherein:

the first lens group includes a first achromatic lens component that includes a three-piece cemented lens, the objective includes a first negative lens, and conditional expressions below $$0.005 \leq h_{min}/h_I \leq 0.72 \quad (2)$$

$$10 \text{ mm} \leq L \leq 100 \text{ mm} \quad (3)$$

$$0.1 \leq L/f \leq 31 \quad (4)$$

are satisfied, where $h_{min}$ is a minimum value of a height of an axial marginal ray in the second lens group, $h_I$ is a height of an axial marginal ray on a lens surface of the objective that is situated closest to the image side, L is a length of the objective, and f is a focal length of the objective.

20. An objective comprising:

a first lens group that has a positive refractive power, conducts a first conversion to convert a divergent pencil of light from an object into a convergent pencil of light, and emits the convergent pencil of light, the first conversion being a conversion that is conducted closest to an object among conversions from a divergent pencil of light into a convergent pencil of light; and a second lens group that has a negative refractive power and is arranged closer to an image side than the first lens group, wherein:

the second lens group includes a second achromatic lens element that includes a three-piece cemented lens, the objective includes a first negative lens, and conditional expressions below $$0.01 \leq h_{min}/h_I \leq 0.7 \quad (2\text{-}1)$$

$$10 \text{ mm} \leq L \leq 100 \text{ mm} \quad (3)$$

$$0.1 \leq L/f \leq 31 \quad (4)$$

are satisfied, where $h_{min}$ is a minimum value of a height of an axial marginal ray in the second lens group, $h_I$ is a height of an axial marginal ray on a lens surface of the objective that is situated closest to the image side, L is a length of the objective, and f is a focal length of the objective.

* * * * *